(12) United States Patent
Barshan et al.

(10) Patent No.: US 11,593,673 B2
(45) Date of Patent: Feb. 28, 2023

(54) SYSTEMS AND METHODS FOR IDENTIFYING INFLUENTIAL TRAINING DATA POINTS

(71) Applicant: ELEMENT AI INC., Montreal (CA)

(72) Inventors: Elnaz Barshan, Montreal (CA); Marc-Etienne Brunet, Montreal (CA)

(73) Assignee: SERVICENOW CANADA INC., Montreal (CA)

( * ) Notice: Subject to any disclaimer, the term of this patent is extended or adjusted under 35 U.S.C. 154(b) by 592 days.

(21) Appl. No.: 16/594,774

(22) Filed: Oct. 7, 2019

(65) Prior Publication Data

US 2021/0103829 A1 Apr. 8, 2021

(51) Int. Cl.
*G06N 5/04* (2006.01)
*G06N 20/00* (2019.01)
*G06N 20/10* (2019.01)

(52) U.S. Cl.
CPC ............... *G06N 5/04* (2013.01); *G06N 20/00* (2019.01); *G06N 20/10* (2019.01)

(58) Field of Classification Search
CPC .......... G06N 5/04; G06N 20/00; G06N 20/10; G06N 3/08
USPC .......................................................... 706/25
See application file for complete search history.

(56) References Cited

U.S. PATENT DOCUMENTS

| | | | |
|---|---|---|---|
| 6,789,069 B1* | 9/2004 | Barnhill | G06N 20/10 706/45 |
| 9,251,473 B2 | 2/2016 | Gamon et al. | |
| 9,619,457 B1 | 4/2017 | Gillick et al. | |
| 10,225,277 B1 | 3/2019 | Shintre et al. | |
| 2009/0327176 A1 | 12/2009 | Teramoto | |
| 2011/0099133 A1* | 4/2011 | Chang | G06F 16/353 706/12 |
| 2016/0379132 A1* | 12/2016 | Jin | H04L 67/535 706/12 |
| 2018/0018553 A1 | 1/2018 | Bach et al. | |
| 2018/0121817 A1 | 5/2018 | Datta et al. | |
| 2019/0050728 A1 | 2/2019 | Sim et al. | |
| 2019/0080205 A1* | 3/2019 | Kaufhold | G06N 3/0472 |
| 2019/0130275 A1 | 5/2019 | Chen et al. | |
| 2019/0188212 A1 | 6/2019 | Miller et al. | |
| 2020/0202170 A1* | 6/2020 | Basu | G06N 7/005 |
| 2020/0265340 A1* | 8/2020 | Chang | G06N 20/10 |
| 2020/0293946 A1* | 9/2020 | Sachan | G06N 5/04 |
| 2020/0334557 A1* | 10/2020 | Kale | G06N 20/00 |

(Continued)

OTHER PUBLICATIONS

Khanna et al., "Interpreting Black Box Predictions using Fisher Kernels", Proceedings of the 22nd International Conference on Artificial Intelligence and Statistics (AISTATS), Japan, 2019, vol. 89, arXiv preprint arXiv:1810.10118, 9 pages.

(Continued)

*Primary Examiner* — Hicham Skhoun
(74) *Attorney, Agent, or Firm* — BCF LLP

(57) ABSTRACT

There is disclosed a method and system for identifying relevant training data points for a prediction by a machine learning algorithm (MLA). The method comprises determining indicators of influence for training data points used to train the MLA. A normalizing function is applied to the indicators of influence to determine normalized indicators of influence. Training data points having the highest and lowest normalized indicators of influence are output for display.

17 Claims, 8 Drawing Sheets

(56) References Cited

U.S. PATENT DOCUMENTS

2020/0356011 A1* 11/2020 Su ........................ G03F 7/70441
2021/0042820 A1*  2/2021 Kumar ..................... G06N 3/08
2022/0093217 A1*  3/2022 Abraham ......... G01N 33/57488
2022/0237416 A1*  7/2022 Araki ................... G06K 9/6262

OTHER PUBLICATIONS

Jackson et al., "Semi-Supervised Learning by Label Gradient Alignment", Computer Science, Machine Learning, 2019, arXiv.org > cs > arXiv: 1902.02336, 12 pages.

Ren et al., "Learning to Reweight Examples for Robust Deep Learning", Proceedings of the 35th International Conference on Machine Learning, Sweden, 2018, arXiv.org > cs > arXiv: 1803.09050, 13 pages.

Ghorbani et al., "Interpretation of Neural Networks Is Fragile", Proceedings of the AAAI Conference on Artificial Intelligence, vol. 33, 2018, 19 pages.

Du et al., "Adapting Auxiliary Losses Using Gradient Similarity", Statistics, Machine Learning, arXiv org > stat > arXiv: 1812.02224, 2018, 17 pages.

Zhao et al., "Saliency Detection by Multi-Context Deep Learning", 2015 IEEE Conference on Computer Vision and Pattern Recognition (CVPR), 2015, pp. 1265-1274.

Ros et al., "Improving the Adversarial Robustness and Interpretability of Deep Neural Networks by Regularizing their Input Gradients", Association for the Advancement of Arlificial Intelligence, 2018, 10 pages.

Koh et al., "Understanding Black-box Predictions via Influence Functions", Proceedings of the 34 th International Conference on MachineLearning, Australia, 2017, 11 pages.

Iinternational Search Report and Written Opinion with regard to PCT/IB2020/059387, dated Dec. 30, 2020.

Zhou et al., "Effects of Influence on User Trust in Predictive Decision Making", Conference on Human Factors in Computing Systems, 2019, vol. LBW2812, https://dl.acm.org/doi/abs/10.1145/3290607.3312962, pp. 1-6.

Chunjie et al., "Cosine Normalization: Using Cosine Similarity Instead of Dot Product in Neural Networks", arXiv—Computer Science—Machine Learning, 2017, https://arxiv.org/abs/1702.05870v5, pp. 1-9.

Barshan et al., "RelatIF: Identifying Explanatory Training Examples via Relative Influence", Proceedings of the 23rd International Conference on Artificial Intelligence and Statistics (AISTATS), 2020, vol. 108, https://arxiv.org/abs/2003.11630, pp. 1-18.

* cited by examiner

SYSTEMS AND METHODS FOR IDENTIFYING INFLUENTIAL TRAINING DATA POINTS

FIELD

The present technology relates to systems and methods for sample-based explainability of a machine learning algorithm (MLA). In particular, the present technology relates to systems and methods for applying an influence function to training data points and normalizing the results of the influence function.

BACKGROUND

Machine learning techniques have proven to be useful for a variety of applications. Many different types of MLAs may be used to perform predictions. One issue common to many of the MLAs is that it is difficult to provide an explanation that a user can understand for why an MLA makes a specific prediction. Modern black box machine learning models output predictions that are often very difficult to interpret. The mathematical relationships that these models learn in order to make predictions from input data can be very obscure, especially as datasets grow in size and model architectures become more complex.

For those wishing to build trust in a model, and who are ultimately accountable for the decisions informed by a model's predictions, it is important to be able to explain these learned relationships. This is often referred to as the "explainability" or "interpretability" of the MLA. A user is typically less likely to rely on predictions made by an MLA when the user isn't able to understand how and why the MLA is making a prediction.

Various techniques have been developed to try to explain how an MLA makes a prediction. In some instances, MLAs have been designed specifically so that the predictions they make can be explained in a way that a human can understand. One example of this would be to integrate a decision tree that can be explained to the user as part of the MLA. But these MLAs that are explainable are typically less accurate than other MLAs that are less explainable, such as neural network based MLAs.

One approach that has been used to explain the predictions made by an MLA is to provide the user with training data points that were most influential on the prediction. An influence function can be used to determine which of the training data points had the greatest influence on the prediction. The influence function can identify the subset of training data that was most influential in the production of a given output prediction.

Because uncommon training data points typically have a larger impact on a model's learned parameters, these training data points are often found to be the most influential points when analysed using an influence function. However, these points are not representative of the training data distribution. Instead, they are uncommon points (outliers, mislabeled examples, or examples having very low probability). Moreover, these highly influential points tend to have a very broad impact on the model behavior, and the impact is not specific to a particular prediction. Identifying these uncommon points is useful for robustness analysis, but they do not serve as a useful form of explanation.

SUMMARY

Influence functions provide an analyst with a way of approximating the impact that removing, reweighting, or perturbing small portions of training data will have on the learned model parameters. Informed by this approximation, one can identify the portion of training data that a model's prediction is most sensitive to. But when using an influence function, often the training data points returned are outliers. Explainability may be improved by providing representative training data points that are specific to a particular prediction. Users may prefer to see relevant training data points that are more similar to the input that led to the prediction provided by the MLA, rather than being presented with outliers that are less related to the prediction.

In order to provide training data points that are more related to a prediction, and reduce the likelihood that outlier training data points will be provided to the user, a normalizing function can be used to normalize the influence scores determined by the influence function. After normalizing the scores, the training data points having the highest normalized influence score can be presented to the user. Typically, the training data points presented after normalizing the influence score are more closely related to the prediction, and less likely to be outliers. These training data points may provide a more useful explanation for users. These training data points may be helpful for a user reviewing and/or adjusting the training data used to train the MLA.

According to a first broad aspect of the present technology, there is provided a method for identifying relevant training data points for a prediction by an MLA. The method comprises: retrieving a plurality of training data points used to train the MLA; retrieving parameters of the MLA; receiving an input for a prediction by the MLA; applying the input to the MLA, thereby determining the prediction; determining, for each of the plurality of training data points, and based on the parameters of the MLA, a gradient of loss of the MLA corresponding to the respective training data point; determining, for each of the plurality of training data points, and based on the gradient of the loss, an indicator of influence of the respective training data point on the prediction; applying, to at least one of the indicators of influence, a normalizing function thereby generating, for at least one training data point of the plurality of training data points, a normalized indicator of influence; determining the relevant training data points by: determining one or more training data points, from the plurality of training data points, having a highest normalized indicator of influence, and determining one or more training data points, from the plurality of training data points, having a lowest normalized indicator of influence; and outputting for display the relevant training data points.

In some implementations of the method, applying the normalizing function comprises determining a cosine similarity between the gradient of the loss and a gradient of the prediction corresponding to the input. The cosine similarity may be determined in the inner product space, where the inner product $\langle x, y \rangle$ is defined as $x^T H^{-1} y$.

In some implementations of the method, applying the normalizing function comprises, for the at least one of the indicators of influence, dividing the respective indicator of influence by the normalizing function.

In some implementations of the method, applying the normalizing function to the at least one of the indicators of influence reduces effects of magnitude of gradient on the at least one of the indicators of influence.

In some implementations of the method, the method further comprises determining, for each training data point of the plurality of training data points, changes to the parameters of the MLA after retraining the MLA without the respective training data point.

In some implementations of the method, retrieving the parameters of the MLA comprises retrieving a plurality of weights associated with the MLA.

In some implementations of the method, the normalizing function normalizes the at least one indicator of influence with respect to the change in the MLA.

According to another broad aspect of the present technology, there is provided a system for identifying relevant training data points for a prediction by an MLA. The system comprises at least one processor and memory storing a plurality of executable instructions. When the instructions are executed by the at least one processor, the instructions cause the system to: retrieve a plurality of training data points used to train the MLA; retrieve parameters of the MLA; receive an input for a prediction by the MLA; apply the input to the MLA, thereby determining the prediction; determine, for each of the plurality of training data points, and based on the parameters of the MLA, a gradient of loss of the MLA corresponding to the respective training data point; determine, for each of the plurality of training data points, and based on the gradient of the loss, an indicator of influence of the respective training data point on the prediction; apply, to at least one of the indicators of influence, a normalizing function thereby generating, for at least one training data point of the plurality of training data points, a normalized indicator of influence; determine the relevant training data points by: determining one or more training data points, from the plurality of training data points, having a highest normalized indicator of influence, and determining one or more training data points, from the plurality of training data points, having a lowest normalized indicator of influence; and output for display the relevant training data points.

In some implementations of the system, the instructions, when executed by the at least one processor, cause the system to determine a cosine similarity between the gradient of the loss and a gradient of the prediction corresponding to the input. The cosine similarity may be determined in the inner product space, where the inner product $<x, y>$ is defined as $x^T H^{-1} y$.

In some implementations of the system, the instructions, when executed by the at least one processor, cause the system to for the at least one of the indicators of influence, divide the respective indicator of influence by the normalizing function.

In some implementations of the system, applying the normalizing function to the at least one of the indicators of influence reduces effects of magnitude of gradient on the at least one of the indicators of influence.

In some implementations of the system, the instructions, when executed by the at least one processor, cause the system to determine, for each training data point of the plurality of training data points, changes to the parameters of the MLA after retraining the MLA without the respective training data point.

In some implementations of the system, the instructions, when executed by the at least one processor, cause the system to retrieve a plurality of weights associated with the MLA.

In some implementations of the system, the instructions, when executed by the at least one processor, cause the system to normalize the at least one indicator of influence with respect to the change in the MLA.

According to another broad aspect of the present technology, there is provided a non-transitory computer-readable medium storing instructions that, when executed by a processor, cause the processor to: retrieve a plurality of training data points used to train a machine learning algorithm (MLA); retrieve parameters of the MLA; receive an input for a prediction by the MLA; apply the input to the MLA, thereby determining the prediction; determine, for each of a plurality of training data points, and based on the parameters of the MLA, a gradient of loss of the MLA corresponding to the respective training data point; determine, for each of the plurality of training data points, and based on the gradient of the loss, an indicator of influence of the respective training data point on the prediction; apply, to at least one of the indicators of influence, a normalizing function thereby generating, for at least one training data point of the plurality of training data points, a normalized indicator of influence; determine relevant training data points by: determining one or more training data points, from the plurality of training data points, having a highest normalized indicator of influence, and determining one or more training data points, from the plurality of training data points, having a lowest normalized indicator of influence; and output for display the relevant training data points.

In some implementations of the non-transitory computer-readable medium, the instructions, when executed by the processor, cause the processor to determine a cosine similarity between the gradient of the loss and a gradient of the prediction corresponding to the input. The cosine similarity may be determined in the inner product space, where the inner product $<x, y>$ is defined as $x^T H^{-1} y$.

In some implementations of the non-transitory computer-readable medium, the instructions, when executed by the processor, cause the processor to, for the at least one of the indicators of influence, divide the respective indicator of influence by the normalizing function.

In some implementations of the non-transitory computer-readable medium, the indicators influence comprise numerical influence scores.

In some implementations of the non-transitory computer-readable medium, the normalized indicators of influence comprise numerical normalized influence scores.

In some implementations of the non-transitory computer-readable medium, the instructions, when executed by the processor, cause the processor to normalize the at least one indicator of influence with respect to the change in the MLA.

Various implementations of the present technology provide a non-transitory computer-readable medium storing program instructions for executing one or more methods described herein, the program instructions being executable by a processor of a computer-based system.

Various implementations of the present technology provide a computer-based system, such as, for example, but without being limitative, an electronic device comprising at least one processor and a memory storing program instructions for executing one or more methods described herein, the program instructions being executable by the at least one processor of the electronic device.

In the context of the present specification, unless expressly provided otherwise, a computer system may refer, but is not limited to, an "electronic device," a "computing device," an "operation system," a "system," a "computer-based system," a "computer system," a "network system," a "network device," a "controller unit," a "monitoring device," a "control device," a "server," and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (e.g., CD- ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first," "second," "third," etc. have been used as adjectives only for the purpose of allowing for distinction between the nouns that they modify from one another, and not for the purpose of describing any particular relationship between those nouns.

Additional and/or alternative features, aspects and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
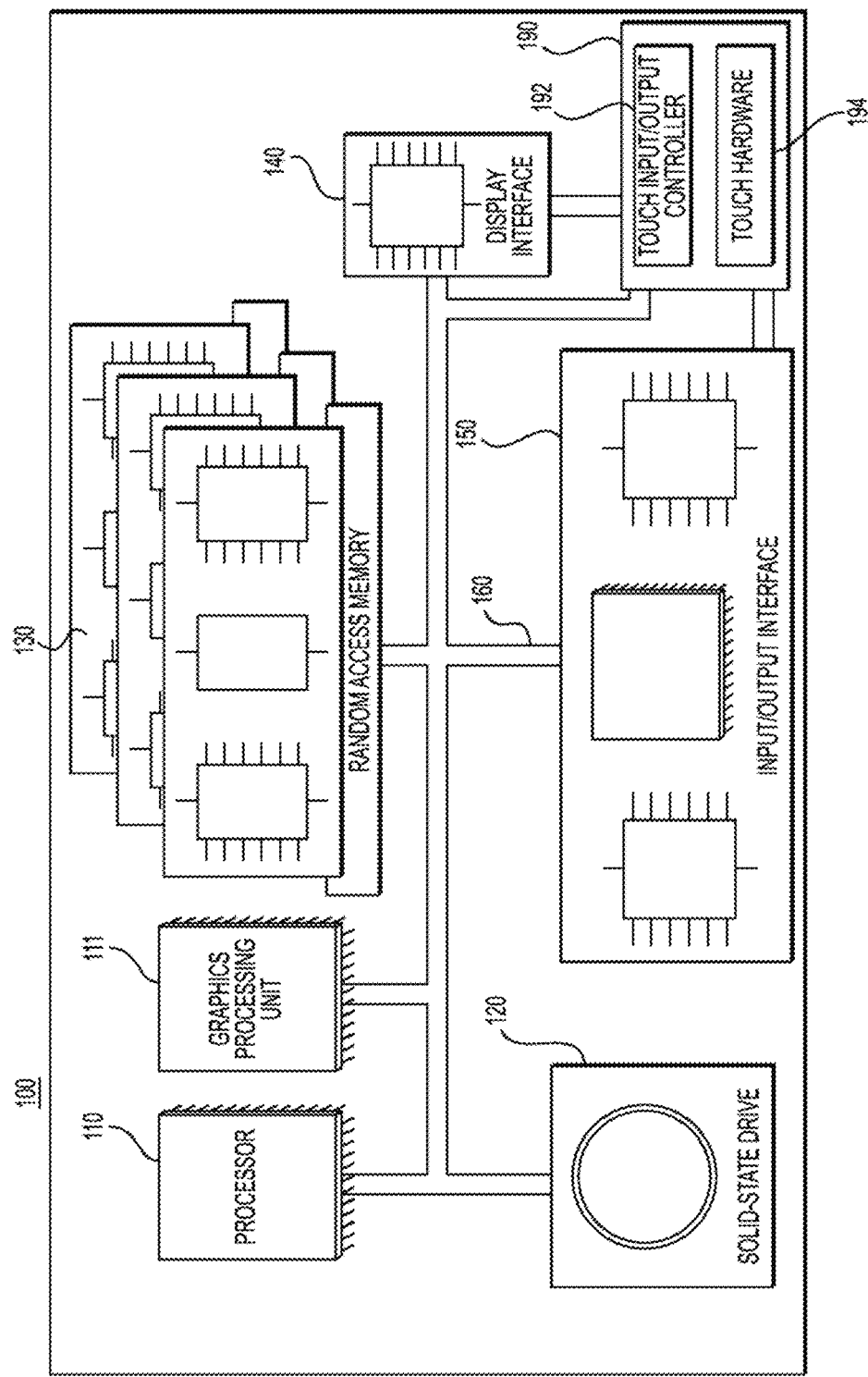
FIG. 1 is a block diagram of an example computing environment in accordance with various embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that one or more modules may include for example, but without being limitative, computer program logic, computer program instructions, software, stack, firmware, hardware circuitry, or a combination thereof.

FIG. 1 illustrates a computing environment 100, which may be used to implement and/or execute any of the methods described herein. In some embodiments, the computing environment 100 may be implemented by any of a conventional personal computer, a computer dedicated to managing network resources, a network device and/or an electronic device (such as, but not limited to, a mobile device, a tablet device, a server, a controller unit, a control device, etc.), and/or any combination thereof appropriate to the relevant task at hand. In some embodiments, the computing environment 100 comprises various hardware components including one or more single or multi-core processors collectively represented by processor 110, a solid-state drive 120, a random access memory 130, and an input/output interface 150. The computing environment 100 may be a computer specifically designed to operate a machine learning algorithm (MLA). The computing environment 100 may be a generic computer system.

In some embodiments, the computing environment 100 may also be a subsystem of one of the above-listed systems. In some other embodiments, the computing environment 100 may be an "off-the-shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Those skilled in the art will appreciate that processor 110 is generally representative of a processing capability. In some embodiments, in place of or in addition to one or more conventional Central Processing Units (CPUs), one or more specialized processing cores may be provided. For example, one or more Graphic Processing Units (GPUs), Tensor Processing Units (TPUs), and/or other so-called accelerated processors (or processing accelerators) may be provided in addition to or in place of one or more CPUs.

System memory will typically include random access memory 130, but is more generally intended to encompass any type of non-transitory system memory such as static random access memory (SRAM), dynamic random access memory (DRAM), synchronous DRAM (SDRAM), read-only memory (ROM), or a combination thereof. Solid-state drive 120 is shown as an example of a mass storage device, but more generally such mass storage may comprise any type of non-transitory storage device configured to store data, programs, and other information, and to make the data, programs, and other information accessible via a system bus 160. For example, mass storage may comprise one or more of a solid state drive, hard disk drive, a magnetic disk drive, and/or an optical disk drive.

Communication between the various components of the computing environment 100 may be enabled by a system bus 160 comprising one or more internal and/or external buses (e.g., a PCI bus, universal serial bus, IEEE 1394 "Firewire" bus, SCSI bus, Serial-ATA bus, ARINC bus, etc.), to which the various hardware components are electronically coupled.

The input/output interface 150 may allow enabling networking capabilities such as wired or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example the networking interface may implement specific physical layer and data link layer standards such as Ethernet, Fibre Channel, Wi-Fi, Token Ring or Serial communication protocols. The specific physical layer and the data link layer may provide a base for a full network protocol stack, allowing communication among small groups of computers on the same local area network (LAN) and large-scale network communications through routable protocols, such as Internet Protocol (IP).

According to some implementations of the present technology, the solid-state drive 120 stores program instructions suitable for being loaded into the random access memory 130 and executed by the processor 110 for executing acts of one or more methods described herein, relating to assessing compatibility of items. For example, at least some of the program instructions may be part of a library or an application.

Figure 2:
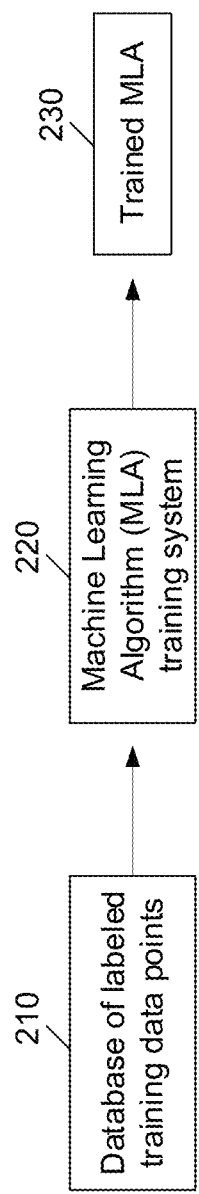
FIG. 2 is a diagram illustrating generating a machine learning algorithm (MLA) in various embodiments of the present technology.

FIG. 2 is a diagram illustrating generating an MLA. It should be understood that FIG. 2 is exemplary and that many other techniques may be used for generating an MLA.

A database of labeled training data points 210 may be used to train an MLA. Each labeled training data point in the database of labeled training data points 210 may include an input and one or more labels corresponding to the input. For example if the input is a picture of a cat or a dog, and the goal of the MLA is to predict whether the image is of a cat or a dog, the label corresponding to the input would indicate whether the input is a picture of a cat or whether it is a picture of a dog. The labels may be applied by humans. In the example where the input is a picture of a cat or a dog, a human may be provided the picture and asked to select either "cat" or "dog." The labels may be otherwise determined, such as from measured data.

All or a portion of the labeled data in the database of labeled training data points 210 may be input to an MLA training system 220. The MLA training system 220 may use any suitable method for generating an MLA. Many different types of MLA have been developed, and many methods for training an MLA have been developed. The MLA training system 220 may use supervised learning, unsupervised learning, reinforcement learning, etc. to train the MLA. Although FIG. 2 illustrates a database of labeled training data points 210, it should be understood that other types of input may be used to train an MLA. For example the training data points may be unlabeled, such as if the MLA training system 220 is performing unsupervised learning.

Various functions may be applied by the MLA training system 220 to the labeled training data points. For example feature engineering may be performed, in which new features may be generated for the training data points. Other preprocessing may be performed on the labeled training data points prior to using the labeled training data points to train the MLA. A feature selection function may be used to select the features, from the labeled training data points, that will be used by the MLA.

The MLA training system 220 may be provided a structure for the MLA and/or the MLA training system 220 may determine a structure for the MLA. For each labeled training data point applied to the MLA, a prediction may be generated. The prediction may be compared to the label for that training data point, and a difference between the prediction and the label may be determined. This difference between the prediction and the label may be referred to as a loss. A loss function may be used to determine the loss. The MLA may adjusted based on each determined loss. For example, the weights of the MLA may be adjusted based on the loss calculated for each training data point.

Figure 3:
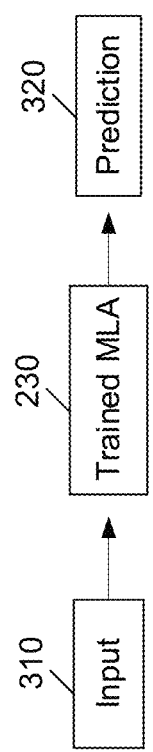
FIG. 3 is a diagram illustrating a trained MLA in accordance with various embodiments of the present technology.

After completing the training, the MLA training system 220 may output a trained MLA 230. FIG. 3 is a diagram illustrating a trained MLA. The trained MLA 230 may include any type of MLA model, or multiple MLA models, such as a neural network, deep neural network, decision-tree based model, Markov model, etc. The trained MLA 230 may receive an input 310. The trained MLA 230 may process the input 310 and output a prediction 320 corresponding to the input 310. The input 310 may be in a same format as the input of the training data points that were used to train the trained MLA 230. The prediction 320 may be in a same format as the labels of the training data points that were used to train the trained MLA 230. Although described as a prediction 320, it should be understood that the trained MLA 230 may output various types of output, such as a classification corresponding to the input 310.

Figure 4:
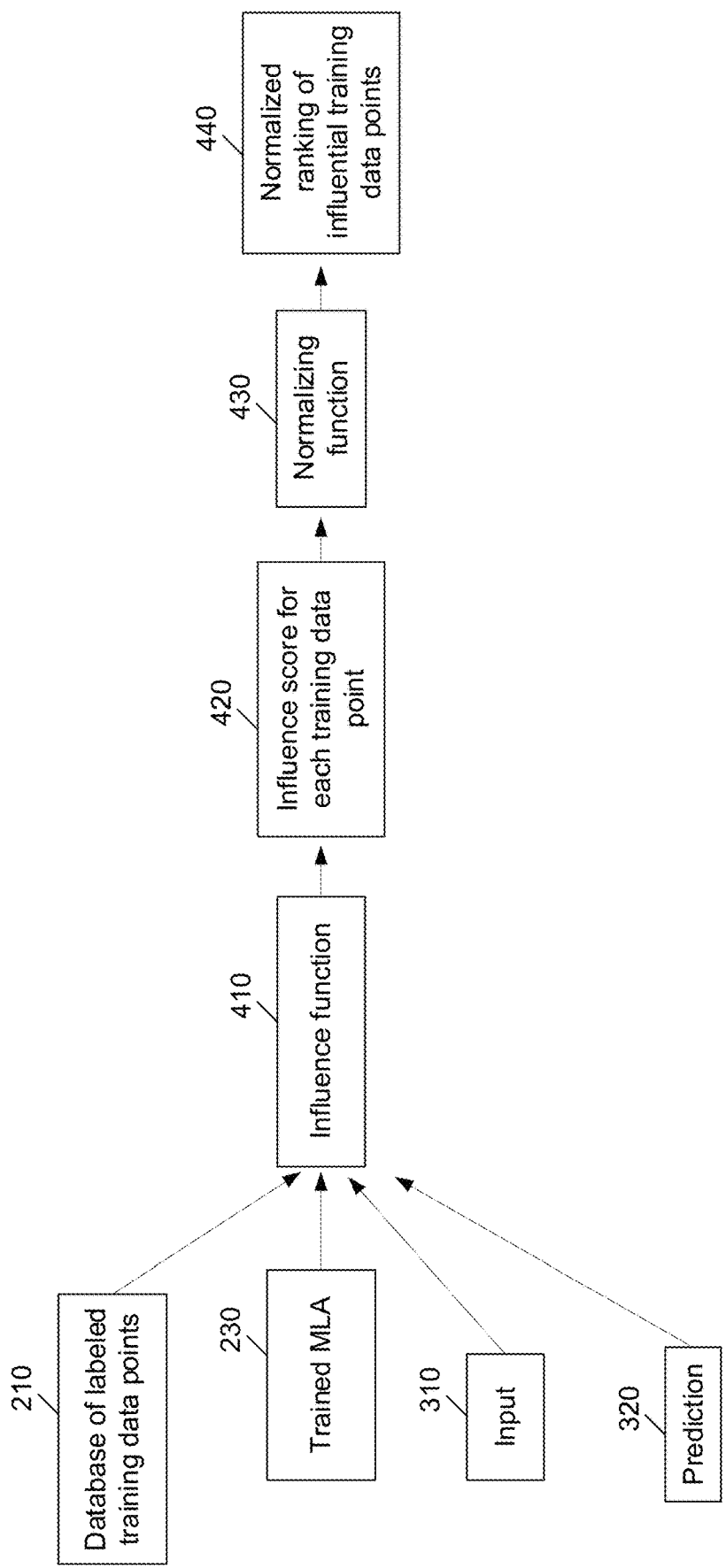
FIG. 4 is a diagram illustrating identifying influential training data points in accordance with various embodiments of the present technology.

FIG. 4 is a diagram illustrating identifying influential training data points. As described above, a user may wish to review the training data points that were influential on the prediction 320 made by the trained MLA 230. For example the user may wish to identify training data points causing erroneous predictions and remove those labeled training data points from the database of labeled training data points 210. Identifying the influential training data points may provide a human-understandable explanation as to how the trained MLA 230 made the prediction 320. As described above, humans are more likely to rely on the prediction 320 if they can understand how the prediction 320 was made.

In order to identify the influential training data points, an influence function 410 is provided the database of labeled training data points 210, the trained MLA 230, the input 310, and/or the prediction 320 corresponding to the input 310. The influence function 410 may determine an indicator of influence, i.e. an influence score, for each of the training data points in the database of labeled training data points 210. The influence score may be a numerical indicator of how much influence the training data point has with respect to the prediction 320. The influence score for a training data point may be determined based on the gradient of loss corresponding to the respective training data point.

As described above, the influence function 410 may indicate that outlier training data points were very influential on the prediction 320. For various reasons, it may be preferable to identify training data points that are more similar to the prediction 320. A normalizing function 430 may be applied to the influence scores 420. In one example, the normalizing function 430 may lower the impact of the magnitude of the gradient of loss on the influence scores 420. Because the impact of the magnitude of gradient of loss is lowered in this example, the impact of the directionality of the gradient of loss may be increased.

Influence function formulation can be viewed as an inner product between the decrease loss vector for a given test sample and the vector of parameter change caused by upweighting a training sample. For low probability training samples (e.g., outliers) the magnitude of loss gradient and consequently the vector of parameter change are often large. This large-sized magnitude can dominate the effect of directional similarity in the inner product and leads to a significantly larger influence score for low probability training samples compared to more typical ones.

A normalizing function 430 may be used to determine samples that change the model parameters in the direction of reinforcing the generated prediction the most. To accomplish this, influence scores may be modified to reflect the directional alignment between the change in model parameters and improved loss for the generated prediction. To measure this directional alignment, the cosine similarity may be determined between the gradient of training data points and test points in the hessian space. The cosine similarity may be determined in the inner product space, where the inner product $<x, y>$ is defined as $x^T H^{-1} y$.

By applying the normalizing function 430 to the influence scores 420, a normalized score may be determined for each of the influence scores 420, and a normalized ranking of influential training data points 440 may be generated by ranking the normalized influence scores. The training data points having highest and/or lowest normalized rankings may then be displayed to a user.

Figure 5:
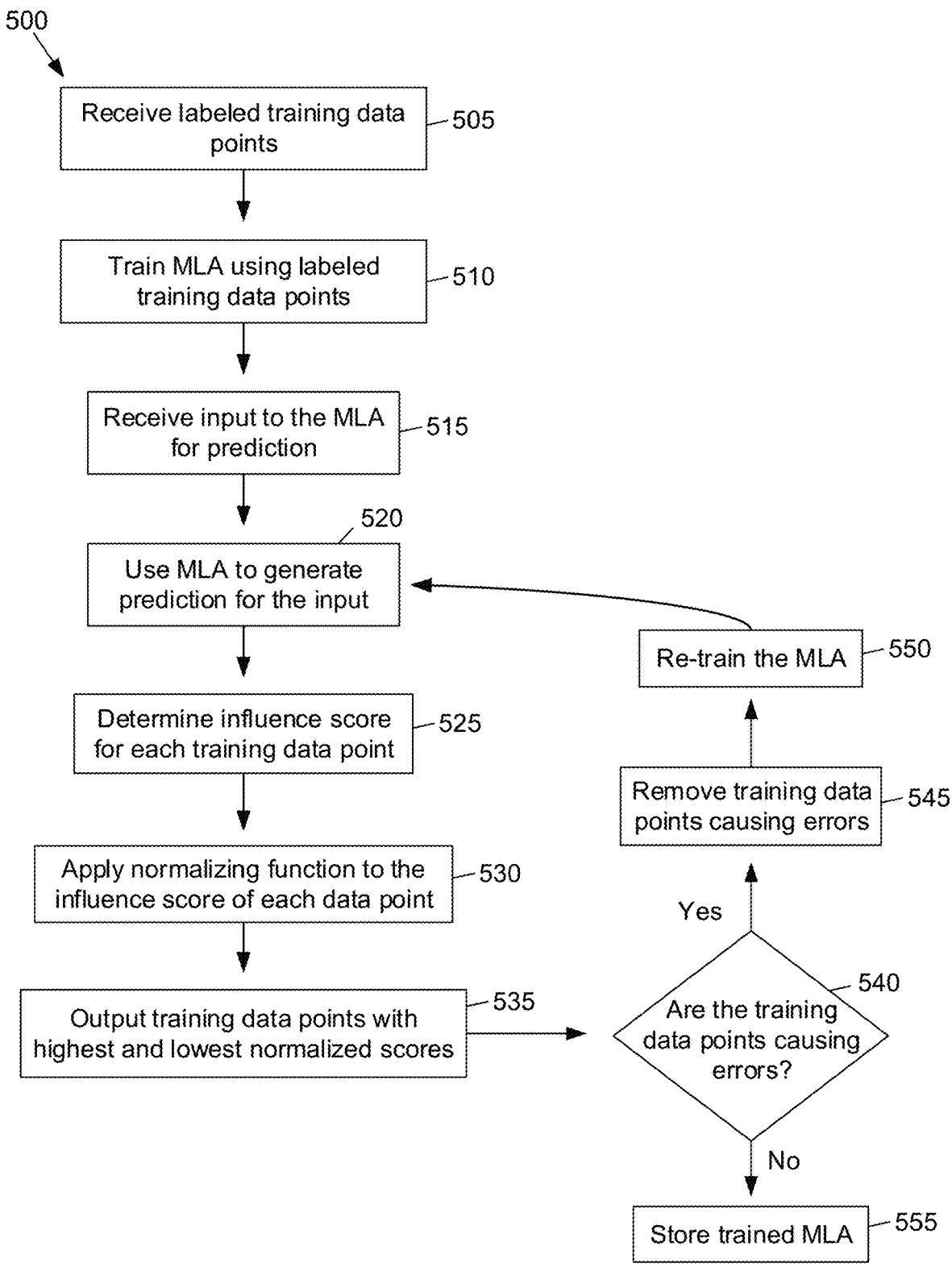
FIG. 5 is a flow diagram of a method for determining normalized influential training data points in accordance with various embodiments of the present technology.

FIG. 5 is a flow diagram of a method 500 for determining normalized influential training data points. In one or more aspects, the method 500 or one or more steps thereof may be performed by a computing system 100. The method 500 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

At step 505 labeled training data points may be received. The labeled training data points may include an input (which may be referred to as a sample) and a label corresponding to the input. The labeled training data points may be retrieved from a database, such as the database of labeled training data points 210.

At step 510 an MLA may be trained using the labeled training data points. A loss function may be used to determine a loss for each of the labeled training data points. The MLA may be adjusted based on the determined loss for each of the labeled training data points. Steps 505 and 510 describe exemplary steps for generating a trained MLA, but it should be understood that any suitable technique for generating a trained MLA may be used.

At step 515 an input for the MLA may be received. The input may be in the same format as the training data points. The input may have the same features as the training data points.

At step 520 the MLA may be used to generate a prediction for the input received at step 515. The input received at step 515 may be applied to the MLA. The MLA may then output the prediction.

At step 525 an influence score may be determined for each training data point. The influence score may be determined based on the gradient of loss for each training data point. The influence score may be determined with respect to the input received at step 515 and/or prediction generated at step 520. The influence score may be determined by multiplying the gradient of loss of the input received at step 515 by the inverse of the hessian matrix times the gradients of loss for the training data points determined at step 525. An exemplary function for calculating the influence score is provided below:

$$-\partial_\theta L(z_{test}, \theta)^T H_\theta^{-1} \partial_\theta L(z, \theta)$$

where $z_{test}$ is the input received at step 515.

At step 530 a normalizing function may be applied to the influence scores determined at step 525. The normalizing function may reduce the effect of the magnitude of the gradient of loss on the influence scores. An exemplary normalized influence function is provided below, where the influence function is the numerator and the normalizing function is the denominator:

$$\text{normalized infl}(z_{test}, z) = \frac{-\partial_\theta L(z_{test}, \theta)^T H_\theta^{-1} \partial_\theta L(z, \theta)}{\sqrt{\partial_\theta L(z, \theta)^T H_\theta^{-1} \partial_\theta L(z, \theta)}}$$

At step 535 the training data points with the highest and/or lowest normalized influence scores may be output. A predetermined amount of training data points may be displayed. For example the two training data points having the highest normalized influence scores and the two training data points having the lowest normalized influence scores may be displayed. The training data points may be displayed and/or the labels of the training data points may be displayed. All or a portion of the normalized influence scores may be stored, such as in a database. As described above, the training data points may be displayed to a user in order to provide an explanation to the user as to why the prediction was made.

At step 540 a user may evaluate the training data points output at step 535 to determine whether any of the training data points are causing the MLA to make erroneous predictions. The user may wish to modify the set of training data points to improve the accuracy of the predictions of the MLA. This process may be referred to as data pruning.

If at step 540 a determination is made that one or more of the training data points are causing errors, the method 500 may continue at step 545 where the training data points causing errors are removed from the set of training data. The training data points may be deleted from the database of labeled training data points 210, or an indication may be stored that these training data points should not be used for training the MLA.

After removing the training data points causing errors at step 545, the MLA may be re-trained at step 550. The MLA may be retrained without using the training data points that were removed at step 545. Instead of retraining the MLA, the MLA may be modified so that the removed training data points no longer have an influence on the MLA. In other words, rather than retraining the entire MLA, the MLA may be modified so that it acts as if it were retrained without the removed training data points. After retraining the MLA at step 550, the method 500 may proceed to step 520 and make another prediction for the input received at step 515.

If, at step 540, a determination is made that the displayed data points aren't causing errors, then the method may proceed to step 555 where the trained MLA may be stored.

Figure 6:
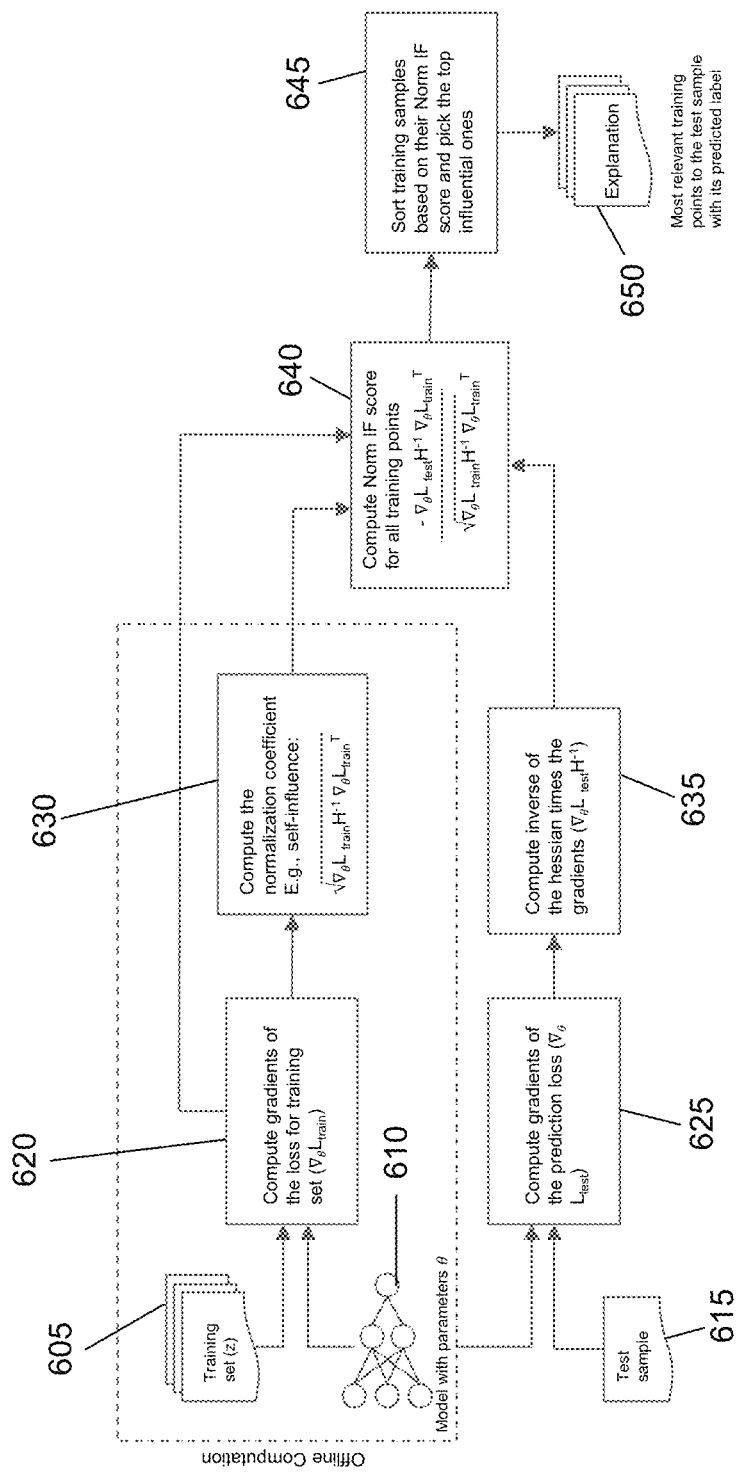
FIG. 6 is a diagram illustrating an exemplary method of determining normalized influence scores in accordance with various embodiments of the present technology.

FIG. 6 is a diagram illustrating an exemplary method of determining normalized influence scores. A training set 605 may be used to train a model 610. The training set 605 may include labeled training data points, such as those stored in the database of labeled training data points 210. The model 610 may form the trained MLA 230.

At 620 and 630, a normalization term associated with each of the training data points in the training set 605 may be precomputed. The gradients of loss for each labeled training data point in the training set 605 may be determined at 620. The self-influence for the training set 605 may then be determined at 630. An example of an equation for determining the self-influence is provided below:

$$\sqrt{\nabla_\theta L_{train} H^{-1} \nabla_\theta L_{train}{}^T}$$

The calculations performed at steps 620 and 630 may be performed at any time after training the model 610. These calculations may be performed prior to receiving a test sample 615.

One example of a normalization term is illustrated at 630, but it should be understood that many other normalization terms may be determined. Another example of a normalization term that may be used is provided below:

$$\|H_{\theta^*}^{-1} g_i\|^*$$

At 625 the gradients of the prediction loss for the test sample 615 may be determined. The test sample 615 may be an input to the model 610, for example the input 310. At 635 the inverse of the hessian times the gradients of the prediction loss may be determined.

At 640 the normalized influence score may be determined for all of the training points. The normalized influence scores may be determined by dividing the influence score by the normalization function. After determining the normalized influence scores, the training samples in the training set 605 may be sorted by their normalized influence scores at 645. The most influential training samples may be selected. The most influential training samples may be the training samples having the highest and/or lowest normalized influence scores.

At 650 an explanation may be displayed to a user. The explanation may include a set of the most influential training samples, determined based on their normalized influence scores. The explanation may include the test sample 615 and/or the prediction for the test sample 615 made by the model 610.

Figure 7:
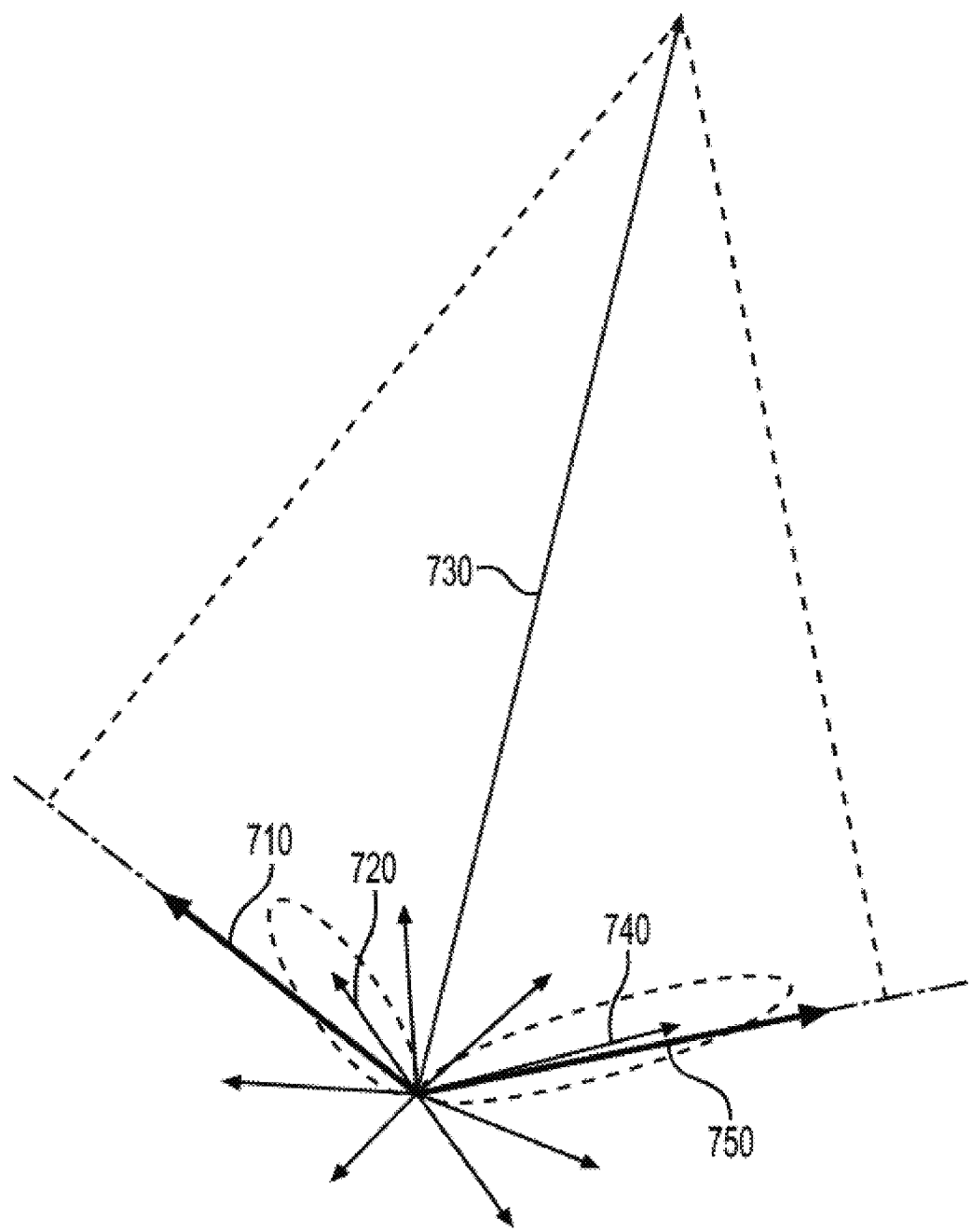
FIG. 7 is a diagram illustrating a geometric interpretation of the proposed technique in accordance with various embodiments of the present technology.

FIG. 7 is a diagram illustrating a geometric interpretation of the proposed technique. The vectors of the gradient of the loss, with respect to the model parameters, for two test samples are illustrated, vector 710 and vector 750. The other vectors in FIG. 7 are vectors of the gradient of the loss for training data points. The influence of each of the vectors for the training data points on the test samples is equal to the projection length of the vector of change in parameters onto the gradient of the test sample loss. The vector of change in parameters may be computed by multiplying the gradient of the loss for the respective training sample by the inverse hessian. The vector 730 has a much larger magnitude than the vectors of the other training data points. The training data point corresponding to this vector 730 becomes the most influential point for the two different test samples because the large magnitude of the vector 730 dominates the effects of directional similarity.

If an influence function were applied to the test samples corresponding to the vectors 710 and 750, the training data point corresponding to the vector 730 would be the most influential training data point for both of those test samples. In some instances it may be useful to determine the most influential training data points without applying any normalization. But this vector 730 is not the most similar training data point to the test samples, and would not provide a useful explanation to an end user for why the MLA made a prediction.

Using a normalizing influence function, the training data point corresponding to the vector 720 would be selected for the test sample corresponding to the vector 710. The vector 720 is much more similar in direction to the vector 710 than the vector 730 is. The training data point corresponding to the vector 720 would likely be more relevant for explaining why the MLA made a prediction to the user. Similarly, the training data point corresponding to the vector 740 would be selected by the normalized influence function for the test sample corresponding to the vector 750.

Figure 8:
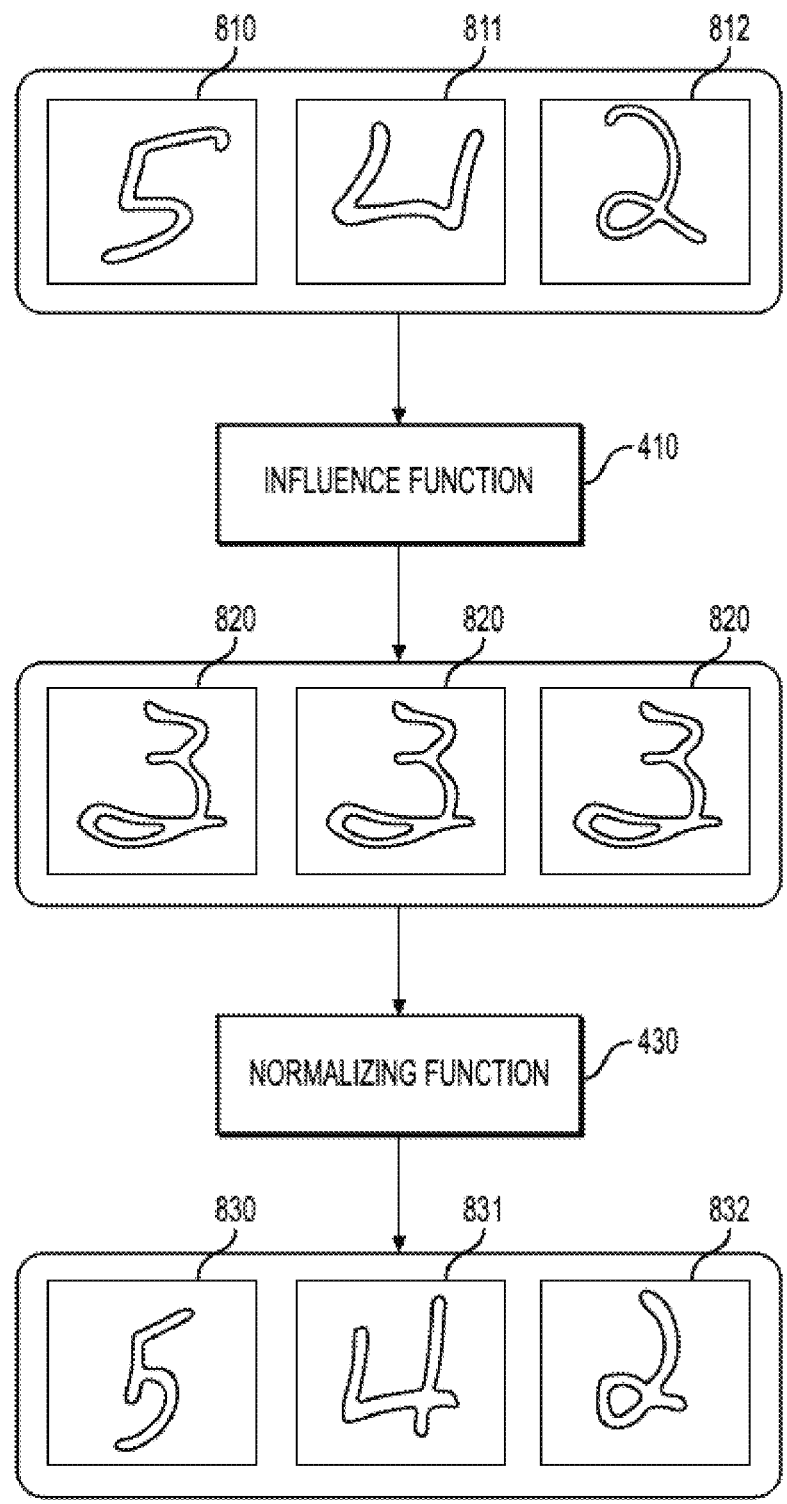
FIG. 8 is a diagram illustrating examples of training data points identified using an influence function and training data points identified using a normalized influence function in accordance with various embodiments of the present technology.

FIG. 8 is a diagram illustrating examples of training data points identified using a normalized influence function. Inputs 810-12 are exemplary inputs to an MLA that receives an image of a numeral as input and outputs a prediction of the numeral in the image. The inputs 810-12 are input to the influence function 410, which determines the training data points having the most influence on the predictions for the inputs 810-12.

For each of the inputs 810, the influence function determines that the same training data point 820 had the most influence on the prediction corresponding to the inputs 810-12. This training data point 820 appears to be an outlier. Although it is the most influential training data point, as determined by the influence function 410, the training data point 820 is not particularly useful to a user seeking to understand why the MLA made a particular prediction. The training data point 820 displays the number '3,' which is different from the numerals in the inputs 810-12. This training data point 820 corresponds to the vector 730 in FIG. 7, which has a high magnitude but is not directionally similar to the inputs.

After the normalizing function 430 is applied, the training data points 830-32 displayed for each of the inputs 810-12 are images of the same numeral as the training data points 830-32. To a user, these training data points 830-32 are likely much more useful in understanding why a particular prediction was made. These training data points 830-32 correspond to the vectors 720 and 740, which are much more directionally similar to the inputs.

While some of the above-described implementations may have been described and shown with reference to particular acts performed in a particular order, it will be understood that these acts may be combined, sub-divided, or re-ordered without departing from the teachings of the present technology. At least some of the acts may be executed in parallel or in series. Accordingly, the order and grouping of the act is not a limitation of the present technology.

It should be expressly understood that not all technical effects mentioned herein need be enjoyed in each and every embodiment of the present technology.

As used herein, the wording "and/or" is intended to represent an inclusive-or; for example, "X and/or Y" is intended to mean X or Y or both. As a further example, "X, Y, and/or Z" is intended to mean X or Y or Z or any combination thereof.

The foregoing description is intended to be exemplary rather than limiting. Modifications and improvements to the above-described implementations of the present technology may be apparent to those skilled in the art.

What is claimed is:

1. A method for identifying relevant training data points for a prediction by a machine learning algorithm (MLA), the method comprising:
   retrieving a plurality of training data points used to train the MLA;
   retrieving parameters of the MLA;
   receiving an input for a prediction by the MLA;
   applying the input to the MLA, thereby determining the prediction;
   determining, for each of the plurality of training data points, and based on the parameters of the MLA, a gradient of loss of the MLA corresponding to the respective training data point;
   determining, for each of the plurality of training data points, and based on the gradient of the loss, an indicator of influence of the respective training data point on the prediction;
   applying, to at least one of the indicators of influence, a normalizing function thereby generating, for at least one training data point of the plurality of training data points, a normalized indicator of influence, wherein applying the normalizing function to the at least one data training point comprises determining a cosine similarity between the gradient of the loss corresponding to the at least one training data point and a gradient of the prediction;
   determining the relevant training data points by:
      determining one or more training data points, from the plurality of training data points, having a highest normalized indicator of influence, and
      determining one or more training data points, from the plurality of training data points, having a lowest normalized indicator of influence; and
   outputting for display the relevant training data points.

2. The method of claim 1, wherein applying the normalizing function comprises, for the at least one of the indicators of influence, dividing the respective indicator of influence by the normalizing function.

3. The method of claim 1, wherein applying the normalizing function to the at least one of the indicators of influence reduces effects of magnitude of gradient on the at least one of the indicators of influence.

4. The method of claim 1, further comprising determining, for each training data point of the plurality of training data points, changes to the parameters of the MLA after retraining the MLA without the respective training data point.

5. The method of claim 1 wherein retrieving the parameters of the MLA comprises retrieving a plurality of weights associated with the MLA.

6. The method of claim 1, wherein the normalizing function normalizes the at least one indicator of influence with respect to the change in the MLA.

7. A system for identifying relevant training data points for a prediction by a machine learning algorithm (MLA), the system comprising:
   at least one processor, and
   memory storing a plurality of executable instructions which, when executed by the at least one processor, cause the system to:
      retrieve a plurality of training data points used to train the MLA;
      retrieve parameters of the MLA;
      receive an input for a prediction by the MLA;
      apply the input to the MLA, thereby determining the prediction;
      determine, for each of the plurality of training data points, and based on the parameters of the MLA, a gradient of loss of the MLA corresponding to the respective training data point;
      determine, for each of the plurality of training data points, and based on the gradient of the loss, an indicator of influence of the respective training data point on the prediction;
      apply, to at least one of the indicators of influence, a normalizing function thereby generating, for at least one training data point of the plurality of training data points, a normalized indicator of influence, wherein applying the normalizing function to the at least one data training point comprises determining a cosine similarity between the gradient of the loss corresponding to the at least one training data point and a gradient of the prediction;
      determine the relevant training data points by:
         determining one or more training data points, from the plurality of training data points, having a highest normalized indicator of influence, and
         determining one or more training data points, from the plurality of training data points, having a lowest normalized indicator of influence; and
      output for display the relevant training data points.

8. The system of claim 7, wherein the executable instructions, when executed by the at least one processor, cause the system to, for the at least one of the indicators of influence, divide the respective indicator of influence by the normalizing function.

9. The system of claim 7, wherein applying the normalizing function to the at least one of the indicators of influence reduces effects of magnitude of gradient on the at least one of the indicators of influence.

10. The system of claim 7, wherein the executable instructions, when executed by the at least one processor, cause the system to determine, for each training data point of the plurality of training data points, changes to the parameters of the MLA after retraining the MLA without the respective training data point.

11. The system of claim 7, wherein the executable instructions, when executed by the at least one processor, cause the system to retrieve a plurality of weights associated with the MLA.

12. The system of claim 7, wherein the executable instructions, when executed by the at least one processor, cause the system to normalize the at least one indicator of influence with respect to the change in the MLA.

13. A non-transitory computer-readable medium storing instructions that, when executed by a processor, cause the processor to:
   retrieve a plurality of training data points used to train a machine learning algorithm (MLA);
   retrieve parameters of the MLA;
   receive an input for a prediction by the MLA;
   apply the input to the MLA, thereby determining the prediction;
   determine, for each of a plurality of training data points, and based on the parameters of the MLA, a gradient of loss of the MLA corresponding to the respective training data point;
   determine, for each of the plurality of training data points, and based on the gradient of the loss, an indicator of influence of the respective training data point on the prediction;
   apply, to at least one of the indicators of influence, a normalizing function thereby generating, for at least one training data point of the plurality of training data points, a normalized indicator of influence, wherein applying the normalizing function to the at least one data training point comprises determining a cosine similarity between the gradient of the loss corresponding to the at least one training data point and a gradient of the prediction;
   determine relevant training data points by:
      determining one or more training data points, from the plurality of training data points, having a highest normalized indicator of influence, and
      determining one or more training data points, from the plurality of training data points, having a lowest normalized indicator of influence; and
   output for display the relevant training data points.

14. The non-transitory computer-readable medium of claim 13, wherein the instructions, when executed by the processor, cause the processor to, for the at least one of the indicators of influence, divide the respective indicator of influence by the normalizing function.

15. The non-transitory computer-readable medium of claim 13, wherein the indicators of influence comprise numerical influence scores.

16. The non-transitory computer-readable medium of claim 13, wherein the normalized indicators of influence comprise numerical normalized influence scores.

17. The non-transitory computer-readable medium of claim 13, wherein the instructions, when executed by the processor, cause the processor to normalize the at least one indicator of influence with respect to the change in the MLA.

* * * * *